US011608300B2

(12) United States Patent
Techer et al.

(10) Patent No.: US 11,608,300 B2
(45) Date of Patent: Mar. 21, 2023

(54) SINTERING AGENT FOR DRY PARTICULATE REFRACTORY COMPOSITION

(71) Applicant: ImerTech SAS, Paris (FR)

(72) Inventors: Romain Techer, Villefontaine (FR); Jérôme Soudier, Vaux en Bugey (FR)

(73) Assignee: Calderys France S.A.S., Paris (FR)

( * ) Notice: Subject to any disclaimer, the term of this patent is extended or adjusted under 35 U.S.C. 154(b) by 0 days.

(21) Appl. No.: 16/312,322

(22) PCT Filed: Jun. 27, 2017

(86) PCT No.: PCT/EP2017/065883
§ 371 (c)(1),
(2) Date: Dec. 21, 2018

(87) PCT Pub. No.: WO2018/002068
PCT Pub. Date: Jan. 4, 2018

(65) Prior Publication Data
US 2019/0218148 A1 Jul. 18, 2019

(30) Foreign Application Priority Data

Jun. 30, 2016 (FR) ...................................... 1670355

(51) Int. Cl.
| C04B 35/66 | (2006.01) |
| C04B 35/18 | (2006.01) |
| C04B 35/63 | (2006.01) |
| C04B 35/01 | (2006.01) |
| C04B 35/14 | (2006.01) |

(52) U.S. Cl.
CPC .............. *C04B 35/66* (2013.01); *C04B 35/01* (2013.01); *C04B 35/14* (2013.01); *C04B 35/18* (2013.01); *C04B 35/6303* (2013.01); *C04B 2235/3427* (2013.01); *C04B 2235/3472* (2013.01); *C04B 2235/3481* (2013.01); *C04B 2235/425* (2013.01); *C04B 2235/445* (2013.01); *C04B 2235/448* (2013.01); *C04B 2235/449* (2013.01); *C04B 2235/50* (2013.01); *C04B 2235/5427* (2013.01); *C04B 2235/5436* (2013.01)

(58) Field of Classification Search
CPC ..... C04B 35/66; C04B 35/043; C04B 35/101; C04B 35/14; C04B 35/482
See application file for complete search history.

(56) References Cited

U.S. PATENT DOCUMENTS

| 3,127,238 A | 3/1964 | Fuchs et al. |
| 4,393,143 A | 7/1983 | Yoshinaka |
| 8,980,775 B2 | 3/2015 | Francy |
| 9,500,373 B2 | 11/2016 | Gabel |
| 10,093,581 B2 | 10/2018 | Jansen |
| 2004/0157724 A1 | 8/2004 | Doza |
| 2004/0157725 A1 | 8/2004 | Doza |

FOREIGN PATENT DOCUMENTS

| CN | 1056482 A | 11/1991 |
| CN | 1861548 A | 11/2006 |
| CN | 101113097 | 1/2008 |
| CN | 101293779 | 10/2008 |
| CN | 101434488 A | 5/2009 |
| CN | 101628823 A | 1/2010 |
| CN | 101691294 A | 4/2010 |
| CN | 102407275 A | 4/2010 |
| CN | 102442828 A | 5/2012 |
| CN | 103601515 A | 2/2014 |
| CN | 104529407 A | 4/2015 |
| CN | 105263883 A | 1/2016 |
| CN | 105294091 A * | 2/2016 |
| CN | 105294119 A | 2/2016 |
| CN | 105297469 A * | 2/2016 |
| GB | 1 442 455 A | 7/1976 |
| JP | S052-097788 | 8/1977 |
| JP | S 59199585 | 11/1984 |
| JP | H02 293373 A | 12/1990 |
| JP | H07-138036 | 5/1995 |
| JP | H09-192777 | 7/1997 |
| JP | 1998-017374 | 1/1998 |
| JP | 2002-255627 A | 9/2002 |
| JP | 2009-067611 A | 4/2009 |
| JP | 2013-534607 A | 9/2013 |
| JP | 2015187055 A | 10/2015 |
| RO | 104541 A * | 10/1992 |
| WO | WO 1991/017969 A1 | 11/1991 |
| WO | WO 2000/75089 | 12/2000 |
| WO | WO2007132497 A2 * | 11/2007 |

OTHER PUBLICATIONS

International Search Report and Written Opinion dated Oct. 12, 2017, in International Application No. PCT/EP2017/065883 (12 pgs.).
Office Action/Final Rejection in Japanese Application No. 2018-569099, dated Mar. 12, 2021, and English translation thereof, (7 pages).
Search Report in corresponding Chinese Application No. 2017800379068.3, dated Mar. 2, 2021 (10 pages total).
Office Action in corresponding Chinese Application No. 201780037968.3, dated Mar. 2, 2021 (14 pages total).
Supplemental Search Report in corresponding Chinese Application No. 2017800379068.3 (2 pages).
Japanese Office Action in corresponding Japanese Application No. 2018-569099.3 (3 pages).

* cited by examiner

*Primary Examiner* — Karl E Group
(74) *Attorney, Agent, or Firm* — Finnegan, Henderson, Farabow, Garrett & Dunner, LLP

(57) ABSTRACT

The present invention relates to a sintering agent for dry particulate refractory compositions and dry particulate refractory compositions. The use of dry particulate refractory compositions also form part of the present invention.

15 Claims, No Drawings

SINTERING AGENT FOR DRY PARTICULATE REFRACTORY COMPOSITION

CLAIM FOR PRIORITY

This application is a U.S. national phase entry under 35 U.S.C. § 371 from PCT International Application No. PCT/EP2017/065883, filed Jun. 27, 2017, which claims the benefit of priority of FR Application No. 1670355, filed Jun. 30, 2016, from which this application claims priority and both of which are incorporated herein by reference.

FIELD OF THE INVENTION

Generally, the invention relates to the technical field of refractory materials. In particular, the present invention concerns a sintering agent for dry particulate refractory composition, with said agent resulting from the combination of at least one mineral compound containing feldspar and at least one phosphate presenting a loss on ignition (at 900° C.) of less than 20%.

The invention also relates to dry particulate refractory compositions comprising refractory particles (or aggregates) and said sintering agent. Such compositions are, in particular, used for the fabrication of furnace lining, for example induction furnaces/crucibles, for the melting of metals in particular.

Lastly, the invention relates to consolidated products obtained from a dry particulate refractory composition according to the invention and to the process for fabricating such products.

TECHNOLOGICAL BACKGROUND

The dry particulate refractory compositions, also referred to as dry mix or dry vibrating mixes (DVM), generally consist of refractory particles (also called aggregates) and a sintering agent. The aggregates, consisting of one or more minerals, generally represent the most important part of the product in quantity. The sintering agent constitutes the essential means of ensuring the cohesion of all the constituents in the refractory products. The sintering agent is also referred to as a heat-activated agent. Although present in refractory compositions in a relatively weak content compared with the quantity of aggregates, the sintering agent has a substantial effect upon the properties and final performance of the refractory filling.

In particular, document WO 2014/184145 (Calderys France) describes DVM particulate refractory compositions forming a specific mineral species called a spinel-type magnesium and aluminium oxide.

Such compositions are implemented "dry", namely, without adding water or liquid binder, or with a very reduced quantity of water or liquid binder (for example, less than 3%). The formation of a dry mix powder traditionally results from compacting at ambient temperature, with the consolidation resulting from subsequent sintering thermal processing. The thermal consolidation processing temperature, also referred to as sintering temperature, is generally between the sintering agent melting temperature and that of the refractory particles. However, the sintering may in certain cases take place at a temperature less than the melting temperature of the sintering agent and the aggregates for example, in the formation of a eutectic mix. During the thermal consolidation processing, the sintering agent generally changes from the solid state to a viscous liquid state, allowing the grains to coalesce.

A number of documents describe the use of the sintering agent for particulate compositions of dry vibrating mixes. In particular, the use of compounds containing boron as a sintering agent for refractory compositions is well known. In particular, document U.S. Pat. No. 4,426,457 describes refractory powders consisting of 40 to 70 wt.-% of $Al_2O_3$, 29 to 59 wt.-% of $SiO_2$, 0.3 to 2 wt.-% of sintering agent, in particular boric acid ($H_3BO_3$) or boron oxide ($B_2O_3$). The use of compounds containing boron as a sintering agent is, in fact, very widespread with formulators of particulate refractory compositions.

Certain compounds containing boron were recently subject to regulation that classifies them in Europe as Carcinogenic, Mutagenic and Reprotoxic (CMR) (EC Regulation no. 1272/2008 of the European Parliament and Council of 16 Dec. 2008 relating to the classification, labelling and packaging of substances and mixtures). These compounds have also been recently placed on the list of candidates of substances classified as "extremely concerning" according to the REACH [Registration, Evaluation, Authorisation and Restriction of Chemicals] regulations, which may lead to particularly onerous legal obligations for industrial companies that handle them. More precisely, they involve the following compounds: boric acid (CAS 10043-35-3, 11113-50-1), boron trioxide (CAS 1303-86-2), anhydrous disodium tetraborate (CAS 1330-43-412179-04-3, 1303-96-4), tetraboron heptoxide and disodium hydrate (CAS 12267-73-1) and other hydrated forms of these substances.

One aim of the present invention is to offer a sintering agent for particulate refractory composition that does not include compounds containing boron and that despite this can maintain the properties and final performance of the refractory materials.

Although it does not describe the problem of the classification as CMR of compounds containing boron, document WO 00/01639 (FOSECO) proposes to avoid the use of a boron-containing additive and describes heat-activated dry refractory compositions comprising a heat-hardening organic binder with a base of formaldehyde resin or epoxy resin.

Nevertheless, the use of such resins, of organic heat-hardening or of thermoplastic resins in general is not suitable. In fact, such resins only allow binding at temperatures lower than the sintering temperatures (in the temperature range 100° C. to 400° C.) and do not ensure cohesion of the particulate mixture in the temperature range, generally higher than 1,000° C. Also, the use of such resins, once completely pyrolysed, promotes porosity inside the particulate mixture that is particularly harmful to the performance of the refractory material.

One aim of the present invention is therefore to offer an alternative to the use of compounds containing boron as sintering agents for dry particulate refractory compositions. Such dry refractory compositions, used to line furnaces for melting metals, must in particular present effective resistance to infiltration by the melted metal and to infiltration by liquid slag (metal oxide mixtures).

SUMMARY OF THE INVENTION

The present invention concerns a sintering agent for dry particulate refractory composition comprising at least 70 wt.-% of refractory aggregates, with said sintering agent comprising:

1% to 99 wt.-% of at least one phosphate compound with a loss on ignition (at 900° C.) of less than 20%, 1% to 99 wt.-% of at least one mineral containing feldspar.

This sintering agent may also include alkaline silicate.

According to one aspect of the present invention, said sintering agent does not include boric acid, boron trioxide, anhydrous disodium tetraborate, tetraboron heptoxide and disodium hydrate or any other hydrated forms of these substances.

The invention also concerns a dry particulate refractory composition comprising:

at least 70 wt.-% of refractory aggregates, at least 0.5 wt.-% of sintering agent according to the invention.

According to one aspect of the invention, refractory aggregates are aluminium oxide, silica, silica-alumina or a mixture of these.

The invention also concerns the use of the dry particulate refractory composition according to the invention for the refractory filling, in particular the refractory lining for induction furnaces.

The invention also concerns the refractory lining of induction furnaces likely to be obtained from the dry particulate refractory composition according to the invention, or according to the abovementioned use.

DETAILED DESCRIPTION OF THE INVENTION

Sintering Agent

The present invention concerns a sintering agent for dry particulate refractory composition comprising at least 70 wt.-% of refractory aggregates, with said sintering agent comprising:

1 to 99 wt.-% of at least one phosphate compound with loss on ignition (at 900° C.) of less than 20%, 1 to 99 wt.-% of at least one mineral containing feldspar.

With regard to the present invention, the sintering agent is particularly suitable for a dry particulate refractory composition comprising at least 70 wt.-% of refractory aggregates, for example at least 80 wt.-%, at least 90 wt.-% or at least 95 wt.-% of refractory aggregates. These percentages are expressed compared with the total weight of the dry refractory composition.

This sintering agent consists of at least two components, namely, an organic component comprising at least one phosphate group, and one mineral component containing feldspar. The respective percentages of these two minimum components are expressed compared with the total weight of the sintering agent.

"Phosphate compound with a loss on ignition (at 900° C.) of less than 20%" means a compound that is chemical in nature that includes at least one phosphate group and presents a loss on ignition (or "Loss of mass on heating") measured at 900° C., of less than 20%.

The loss on ignition is determined in air or in an oxidising atmosphere, by calcination of the sample at a temperature of 900° C.±25° C. The loss on ignition therefore represents a difference in mass, or more precisely the mass before calcination m0 minus the mass after calcination m1.

This is sometimes expressed as a percentage, as follows: loss on ignition (%)=100×(m0−m1)/m0.

According to one embodiment of the present invention, the sintering agent includes at least one phosphate compound having a loss on ignition (at 900° C.) of less than 18%, for example at 15 wt-%.

According to another embodiment the present invention, said phosphate compound is an alkaline phosphate and in particular includes at least one of the following chemical compounds $(NaPO_3)_n$, $KH_2PO_4$, $K_2HPO_4$, $K_3PO_4$ or a mixture of these compounds.

The sintering agent according to the present invention also uses a mineral containing feldspar.

The term "mineral containing feldspar" also means "feldspar" or "feldspathoid".

Feldspar is a mineral with a double silicate base, aluminium, potassium, sodium or calcium. Feldspar is from the group of tectosilicates. There are numerous feldspars, of which the main ones are orthoclase, albite and anorthite. In particular, "feldspar" in this context means minerals such as plagioclases (for example albite, oligoclase, andesine, labradorite, bonite and anorthite), orthoclases and other feldspars of potassium containing sanidine, microline and anorhoclase, petalites, feldspars containing barium such as hyalophane and celsian and other similar minerals that are found in granites, diorites, granodiorites, leptynites, albitites, feldspathic sand and other similar materials.

"Mineral containing feldspar" also means "feldspathoid". The feldspathoids are a group of minerals that resemble feldspars but that have a different structure and typically a much lower level of silica. Reference may be made in particular to minerals such as noseane, analcime, cancrinite, leucite, nepheline (for example, nepheline syenite), sodalite (for example, hauyne) and plagiocalses, orthoclases, petalites, hyalophanes and other similar materials such as lazurite produced in granites, diorites, granodiorites, leptynites, albitites, feldspathic sand and other similar materials.

In certain embodiments, said mineral containing feldspar comprises or mainly consists of feldspar. In some methods of embodiments of the invention, said mineral containing feldspar comprises or mainly consists of a feldspathoid mineral. In some embodiments, said mineral containing feldspar comprises or consists mainly of a mixture of feldspar and a feldspathoid mineral. In one embodiment, the feldspar containing a filler material is an albitic mineral, that is, a feeder material comprising albite, for example, a Turkish albitic mineral, for example, an albite deposit in the city Milas in the Muğla region of Turkey. In some embodiments, the feldspar containing the feeder material is an albite deposit containing albite, one or more Fe-bearing minerals and one or more Ti-bearing minerals, for example, an albite deposit containing albite, biotite, rutile and/or sphene, and one or more quartz, muscovite and apatite, for example, a deposit containing albite, biotite, rutile, quartz, muscovite, sphene and apatite.

The inventors realised that a combination of the two elements, namely a phosphate compound with loss on ignition (at 900° C.) of less than 20% and a mineral containing feldspar, offered an alternative to the use of compounds containing boron as a sintering agent for dry particulate refractory composition. Such dry particulate refractory compositions, used to line furnaces used for the melting of metals, present effective resistance to infiltration by melted metal as shown in the examples given below.

The sintering agent according to the invention is such that it allows the start of the sintering phase at a low temperature, for example about 700° C.

Also, the sintering agent according to the invention presents the advantage of comprising a mixture of different agents and thus presenting a sintering temperature over a wide temperature range, for example between 500° C. and 950° C. in the case of a system of silica type aggregates as a sintering agent. This constitutes an advantage particularly compared with the use of compounds containing a boron atom whose sintering temperature is fixed and defined by the eutectic temperature of the $SiO_2$—$B_2O_3$-system. This has the advantage of promoting a good balance between the sintered layer intended to be in contact with the metal being melted and the powdery/crumbly layer at the back of the refractory product. The presence of the sintered layer has the advantage of leading to the impermeability of the metal being melted in the contact zone (increased thickness of the sintering). Also, the presence of a powdery/crumbly layer stops any piercing of the metal being melted and, as a result, preserves the installation as it is. The presence of a powdery layer also allows participation in the flexibility of the refractory lining, namely the capacity to resist without cracking any geometrical deformation in the course of use, which preserves the durability of the installation. Also, there is the advantage that the surface to be in contact with the metal being melted has effective mechanical resistance, preserving the structure from any shocks in loading the furnace. The use of the sintering agent according to the invention, which consists in a combination of a sintering agent with a chemical composition containing at least one phosphate group with a mineral sintering agent containing feldspar provides all of the advantages referred to above in consolidating the refractory material and thereby ensuring the sustainability of the refractory material over time.

According to one embodiment of the invention, the sintering agent comprises:

10% to 50 wt.-% of at least one phosphate compound with loss on ignition (at 900° C.) of less than 20%, for example from 12 to 40 wt.-% or from 15 to 30 wt.-%, 50% to 90 wt.-% of at least one mineral containing feldspar, for example from 60 to 88 wt.-% or 70 to 85 wt.-%.

According to another embodiment of the present invention, the sintering agent also comprises from 1 to 50 wt.-% of at least one alkaline silicate, for example from 2 to 40 wt.-% or from 3 to 30 wt.-%.

According to one embodiment of the present invention, the alkaline silicate is chosen from the group consisting of sodium silicate, potassium silicate, lithium silicate and a mixture of these compounds.

According to another embodiment, the sintering agent according to the invention comprises or mainly consists of:

1 to 98 wt.-% of at least one phosphate compound with loss on ignition (at 900° C.) of less than 20%, for example from 10 to 48 wt.-%, 1 to 98 wt.-% of at least one mineral containing feldspar, for example from 50 to 88 wt.-%, and 1 to 50 wt.-% of a least one alkaline silicate, for example from 2 to 40 wt.-%.

According to another embodiment of the present invention, the sintering agent does not include any compound comprising a boron atom. In particular, according to this embodiment, the sintering agent does not include boric acid, boron trioxide, anhydrous disodium tetraborate, tetraboron heptoxide nor disodium hydrate or any other hydrated forms of these substances.

One advantage of the present invention is to offer a sintering agent for particulate refractory composition that does not comprise compounds containing boron in accordance with the REACH regulations and that, despite this, allows the properties and final performance of the refractory materials to be maintained.

Dry Particulate Refractory Composition

The present invention concerns a dry particulate refractory composition. This composition is in particular of a dry mix or dry vibrating mix. Such compositions are used as refractory linings in various industrial applications, such as ladles for moulding and/or receiving metals. Such compositions are commonly installed inside metallurgic pockets, then mechanically compacted, for example by using a mechanical vibrating tool. The compacted composition is then sufficiently stable to form an intermediate lining, sometimes called green lining or lining after compacting, which is then sintered during the use of the foundry ladle, for example by the introduction of steel or molten iron at a high temperature of the order of 1,500° C. or more. The sintering of the refractory lining may therefore take place during the operation to put the foundry ladle into service.

These compositions are called dry particulate refractory compositions. As used here, the word "dry" must be understood as having a level of humidity of less than 1 wt.-%, for example less than 0.5 wt.-%, which for the dry particulate refractory composition, without the addition of the sintering agent, is determined by a loss on ignition after drying at 110° C.

The present invention concerns a dry particulate refractory composition consisting of:

at least 70 wt.-% of refractory aggregates, for example at least 80 wt.-%, at least 90 wt.-% or at least 95 wt.-%, at least 0.5 wt.-% of sintering agent according to the present invention, for example at least 1 wt.-% or at least 1.5 wt.-%, with the weight percentages being calculated compared with the total weight of the dry refractory composition.

The dry particulate refractory composition contains at least 70 wt.-% of refractory aggregates (also referred to as refractory particles), based on the total dry weight of the dry refractory composition. The term "refractory aggregates" means any mineral material apart from the sintering agent irrespective of its size. Regarding the present invention, the term "aggregate" also means fine particles, in particular of a size of less than 100 microns (in some cases considered as being a part of the mould). In one method of realisation, the dry particulate refractory composition contains 70 wt.-% to 99.5 wt.-%, for example, 75 wt.-% to 99 wt.-%, or 80 wt.-% to 98 wt.-% of aggregate. For example, the dry particulate refractory composition contains about 75 wt.-%, about 80 wt.-%, about 85 wt.-% or about 90 wt.-% of aggregate.

The dry particulate refractory compositions, once put in place in the receptacle and compacted, must present a high degree of compactness. This means that the granulometric distribution of the refractory particles must be optimised in order to have a good ratio between large, fine and ultra-fine particles, whilst avoiding any slow or ineffective compacting over time.

It is preferable for the refractory aggregates to be alumina, silica, silica-alumina or a mixture of these. Where they are alumina in type (for example, tabular alumina, calcinated alumina, white or brown corundum, bauxite, reactive alumina, semi-reactive alumina), the refractory aggregates contain 52 wt.-% to 99 wt.-% of $Al_2O_3$, for example 60 wt.-% to 99 wt.-% or 70 wt.-% to 99 wt.-%. Where they are silica in type, the refractory aggregates contain a minimum of 90 wt.-% of $SiO_2$, for example a minimum of 95 wt.-% of $SiO_2$ or a minimum of 96 wt.-% or 97 wt.-%. Where they are silica-alumina (for example, chamotte, mullite, cyanite, andalusite) the refractory aggregates contain 5 to 70 wt.-% of $Al_2O_3$, for example 10 to 60 wt.-%, and they contain 40 to 75 wt.-% of $SiO_2$.

According to one embodiment of the present invention, the dry particulate refractory composition includes refractory aggregates chosen from the group consisting of zirconia, zircon, magnesite, olivine, chromium oxide or chromium ore, spinel, silicon carbide, quartzite, quartz, vitreous silica, brown corundum, white corundum, tabular alumina, calcinated alumina, reactive or semi-reactive alumina, bauxite, sintered or electro-cast sinter, and calcinated chamotte having a rate of alumina of between 30 and 75 mass-%, andalusite, cyanite, sillimanite or a mixture of these aggregates.

According to a preferred embodiment, the dry particulate refractory composition includes refractory aggregates of quartz, quartzite, vitreous silica or a mixture of these. Quartz is distinguished from quartzite by the size of the elementary crystallites, resulting from the geological method of formation. Vitreous silica is obtained by fusing quartz or quartzite.

The choice of aggregates is generally based on a combination of technical characteristics, including mineral composition, chemical composition, density, granulometric distribution and form.

Refractory aggregates may contain, consist mainly of or consist of particles whose granulometric distribution is of a size of between 0.5 µm to 45 mm or 0.5 µm to 40 mm, determined by the quantity of material conserved on a sieve of suitable size and is expressed as a percentage of the total initial dry mass of the material.

In some embodiments, the aggregate contains, consists mainly of or consists of:
particles of up to about 10 mm,
particles of up to about 6 mm,
particles of up to about 4 mm,
particles of up to about 2 mm, up to about 1 mm in size.

In another embodiment, the aggregate contains, consists mainly of or consists of:
100% of particles up to about 10 mm,
80% of particles up to about 6 mm,
75% of particles up to about 4 mm,
60% of particles up to about 1 mm in size.

In another embodiment, the aggregate contains, consists mainly of or consists of:
100% of particles up to about 10 mm,
80% of particles up to about 6 mm,
60% of particles up to about 4 mm,
40% of particles up to about 1 mm in size.

In yet another embodiment, the aggregate contains, consists mainly of or consists of:
100% of particles up to about 6 mm,
95% of particles up to about 4 mm,
65% of particles up to about 1 mm in size.

The aggregate particles may be in various forms, in particular spheroid or angular. The form of the aggregates has an effect upon the granular stacking and therefore the dry vibrated density of the product put in place.

According to one embodiment, the granulometric distribution of the particles, that is, the proportion of each range of size of the dry mix product in place, is equal to at least 78%, preferably 80% to 82%, of the theoretical density of the starting aggregate mixture with 100% compactness (zero inter-particulate porosity). The term "vibrated density" is known to professionals and they know how to measure this parameter. As an indication, it is measured by putting in place a dry mix in a rigid cylindrical mould presenting an internal volume of 1 dm$^3$, then determining the mass of the dry material after compaction under a pressure of 4 kPa, by vibration on a vibrating table at an amplitude of 0.8 mm, a frequency of 50 Hz and for a period of 90 seconds.

The dry particulate refractory composition according to the present invention contains at least 0.5 wt.-% of sintering agent according to the invention, based on the total dry weight of the dry refractory composition. In one embodiment, the dry particulate refractory composition contains at least 1 wt.-% or at least 1.5 wt.-% of sintering agent. For example, the dry particulate refractory composition according to the present invention contains 1 wt.-% to 30 wt.-%, for example, 1.5 wt.-% to 25 wt.-%, or 2 wt.-% to 20 wt.-% of sintering agent. For example, the dry particulate refractory composition contains about 1 wt.-%, about 1.5 wt.-%, about 2 wt.-% or about 5 wt.-% of sintering agent.

The dry refractory composition may also include one or more additives, in particular one or more of the following additives: anti-dust agent, anti-moisture lubricating agent and/or temporary binding agent.

According to one embodiment, the dry refractory composition according to the invention includes:
0.1 wt.-% to 1.5 wt.-% of anti-dust agent, and/or
0.1 wt.-% to 1.5 wt.-% of lubricating agent, and/or
0.1 wt.-% to 5 wt.-%, for example 0.1 to 3 wt.-% or 0.1 to 1.5 wt.-% of anti-moisture agent, and/or
0.1 to 5 wt.-% of temporary binder.

The dry refractory composition may contain one or more anti-dust agents. These may in particular include the following compounds: fuel oil, hydrocarbons, mineral oil, for example rapeseed oil.

The dry refractory composition may contain one or more lubricating agents. These include the following in particular: metallic stearates such as aluminium stearate, magnesium stearate, calcium stearate and zinc stearate, lamp black, graphite or a mixture of these compounds.

The dry refractory composition may contain one or more anti-moisture agents. These may include the following in particular: These include the following compounds in particular: silicon, barium sulphate, calcium fluoride, lamp black, graphite, coke or a mixture of these compounds.

The dry refractory composition may contain a temporary binding agent, aimed at ensuring the cohesion of the particulate mixture after heating at a temperature of between 120° C. and 500° C. The temporary binder may be obtained at heat, for example by means of heat-hardening resins. Alternatively, this temporary binding may be obtained after heating at the temperature for melting the binding agent, then cooling by means of thermoplastic resins, for example. The temporary binding, that is, the cohesion of the particulate mixture at temperatures lower than the sintering start temperature, may be useful for guaranteeing the mechanical resistance of the refractory lining before the development of mechanical resistances resulting from the sintering. The mechanical properties developed by the temporary binding agent may be advantageous in the withdrawal of the working range of the installation or on loading liquid or solid metals, in order to avoid damaging the refractory lining that has not yet been sintered.

The dry particulate refractory composition according to the invention is characterised by a flow facilitating installation and placement.

The dry refractory composition according to the invention is prepared by a mixture of raw materials for a time period of several minutes.

Applications

The present invention also concerns the use of the dry particulate refractory composition according to the invention in order to form a refractory lining (or refractory coating) by installation in a receptacle. The word "receptacle" means an induction furnace, for example a crucible-style furnace, a cement kiln, a furnace for developing and smelting aluminium or its alloys, a furnace for converting or smelting steel and cast iron, ferrous and non-ferrous alloys, an induction furnace or a channel furnace.

According to one method of realisation of the present invention, the dry particulate refractory composition according to the invention is used for refractory lining, in particular the refractory lining of crucible induction furnaces, the inductors of holding furnaces and the tanks of holding furnaces or casting furnaces found in the smelting industry for ferrous and non-ferrous metals.

Such dry refractory compositions, used to line furnaces used for melting metals, must in particular present effective resistance to infiltration and wear by the melted metal. They must also allow a thick, crumbly safety layer on the cool face of the furnace.

According to another aspect, the invention concerns a refractory lining that may be obtained from the dry particulate refractory composition of the invention, or according to the abovementioned use.

The present invention also relates to consolidated products obtained from a dry particulate refractory composition according to the invention and from the processes used to manufacture such products.

More precisely, the process for manufacturing a sintered product according to the invention includes the following stages:

a) preparation of a dry particulate refractory composition according to the invention;

b) shaping said dry particulate refractory composition, in particular through pressing, packing or vibration;

c) consolidating thermal treatment by sintering.

This process may be used for manufacturing the side wall and bottom of a crucible induction furnace. The side wall and the bottom of such a crucible constitute the coating or lining of the furnace.

According to one embodiment, the use of the sintering agent according to the invention improves the resistance to heat shock and as a result improves the life of the refractory product.

According to a preferred embodiment, the dry particulate refractory composition according to the invention is compacted by vibration. The compaction may be carried out according to the progress of the transfer of the composition to the receptacle to be lined. An increase in the temperature then allows the sintering agent to be activated, that is, it allows the sintering agent particles to melt or to react with the refractory particles to ensure the cohesion of the refractory particles.

In stage c), the consolidating thermal treatment, or sintering, is preferably carried out at a temperature greater than the temperature in use.

Examples

Compositions of Dry Refractory Mixes

The dry particulate refractory compositions according to the present invention and outside the invention have been prepared as described below.

The following raw materials were used for all the examples:

TABLE 1

| Aggregates | Specification | % in weight (by sieving) |
| --- | --- | --- |
| Quartz/Quartzite | Size of aggregates 4-10 mm | 12% |
| | Size of aggregates 1-4 mm | 40% |
| | Size of aggregates <1 mm | 48% |

The following compounds were used:

Anorthite feldspar (Sibelco);

FFB393® (Budenheim): potassium dihydrogen orthophosphate (mainly potassium phosphate);

Budit8® (Budenheim): polyphosphoric acid, sodium citrate (mainly sodium phosphate);

FFB252® (Budenheim): phosphoric acid, trisodium citrate, dode hydrate;

FFB493® (Budenheim): sodium dihydrogen orthophosphate;

Portil A® (Care Chemicals): sodium silicate ($Na_2SiO_3$);

FERRO Frit TF 9015 SE and Frit TF 90 5158 M of composition and loss on ignition according to Table 2.

TABLE 2

| | Sinter 1 | Sinter 2 |
| --- | --- | --- |
| Loss on ignition at 900° C. | 0.37% | 0.34% |
| $SiO_2$ | 50.4% | 48.7% |
| CaO | 10.4% | 0.4% |
| $Na_2O$ | 10.3% | 17% |
| $Al_2O_3$ | 6.6% | 1.2% |
| ZnO | 10.1% | — |

Loss on Ignition of Examples of Phosphate Compounds:

TABLE 3

| Formula | Loss on ignition at 900° C. |
| --- | --- |
| FFB393 ® (Budenheim) | 13.5% |
| Budit 8 ® (Budenheim) | 0.1% |
| FFB252 ® (Budenheim) | 44.9% |
| FFB493 ® (Budenheim) | 23% |

Corrosion Test in Crucible Induction Furnace

The resistance to infiltration and wear and the thickness of the crumbly safety layer on the back surface of the refractory coating are assessed by carrying out a corrosion test in an induction crucible furnace according to the method described below.

The various raw materials and the sintering agent are introduced into a mixer and mixed dry for 5 minutes at a speed of 44 revolutions per minute.

The dry mixes are then poured into suitable moulds for fabricating the voussoirs of a height of about 20 cm. Then a compaction stage is carried out for a period of 1 minute 30 seconds on a vibrating bench (amplitude 0.5 mm). The voussoirs prepared are used as test pieces for the refractory coating of the induction crucible furnace.

Once installed, the materials undergo a filtering stage according to the heat cycle defined below; the provision of the calories required for sintering the refractory coating is carried out using the liquid iron at a high temperature present in the crucible, as follows:

Increase in temperature up to 1,550° C. in three hours;

Temperature level at 1,550° C. for three hours;

Draining and lowering of temperature.

The sintering stage is followed by at least three successive meltings of an iron slag mix according to the same thermal cycle defined above. The voussoirs of the various compositions are then dismantled and cut to obtain two equal sections.

Characterisation of the Dry Mixes Obtained

Using the previously cut voussoirs, the resistance to corrosion and the thickness of the crumbly safety layer on the cool face of the furnace are assessed by analysing the comparative images of the formulations.

Two types of parameter are taken into account in assessing the resistance to corrosion: wear and infiltration. The results are classified according to a scale that varies between a small amount of wear and/or a small amount of infiltration up to a lot of wear and/or a lot of infiltration.

The crumbly safety layer on the cool face of the furnace is taken into account to assess the performance of the refractory material. This crumbly layer is necessary in order to stop infiltrations of liquid metal and to facilitate the dismantling of the furnace. It is classified according to the following three criteria: non-existent, fine or thick.

The results concerning the comparative corrosion tests carried out using various compositions are presented in the tables below.

The examples of the dry particulate refractory compositions include two essential constituents, namely aggregates and a sintering agent whose respective quantities are expressed as a weighted percentage. So, for example, Example A1 consists of 97.5% of quartz and quartzite aggregates (Table 1) and 2.5% of sintering agent whose nature and quantity are also given (Table 4).

TABLE 4

Examples A1 and A2 are according to the invention. Examples Comp A1 and Comp A2 are outside the invention. The tests presented in this table are carried out in the same test.

| Example no. | A1 | A2 | Comp A1 | Comp A2 |
|---|---|---|---|---|
| Aggregates (%) | 97.5 | 96.8 | 97.0 | 97.8 |
| Sintering agent | 2.5 | 3.2 | 3.0 | 2.2 |
| Nature of the sintering agent - Quantity (%) | Feldspar - 2.0 FFB393 - 0.5 | Feldspar - 1.9 FFB393 - 0.6 Portal A - 0.7 | Feldspar - 3.0 | FFB393 - 2.2 |
| Resistance to infiltration and wear | ++ | ++ | − | − |
| Crumbly safety layer on cool face of furnace | Thick | Thick | Thick | Fine |

++: very good resistance to infiltration and wear
−: poor resistance to infiltration and wear It should be noted that the composition of the A2 dry mix presents mechanical resistance that is greater than composition A1, which gives it an additional advantage as a refractory coating for the parts outside the tank of the induction furnaces.

TABLE 5

Example B is according to the invention.
Example Comp B is outside the invention.

| Example no. | B | Comp B |
|---|---|---|
| Aggregates (%) | 97.5 | 97.1 |
| Sintering agent (%) | 2.5 | 2.9 |
| Nature of the sintering agent - Quantity (%) | Feldspar - 2.0 Budit 8 - 0.5 | Budit 8 - 2.9 |
| Resistance to infiltration and wear | ++ | −− |
| Crumbly safety layer on cool face of furnace | Thick | Fine |

TABLE 6

Examples Comp C1 and Comp C2 are outside the invention.

| Example no. | Comp C1 | Comp C2 |
|---|---|---|
| Aggregates (%) | 97.5 | 99.1 |
| Sintering agent (%) | 2.5 | 0.9 |
| Nature of the sintering agent - Quantity (%) | Feldspar - 2.0 FFB252 - 0.5 | FFB252 - 0.9 |
| Resistance to infiltration and wear | + | − |
| Crumbly safety layer on cool face of furnace | Fine | Non-existent |

TABLE 7

Examples Comp D1 and Comp D2 are outside the invention.

| Example no. | Comp D1 | Comp D2 |
|---|---|---|
| Aggregates (%) | 97.3 | 97.3 |
| Sintering agent (%) | 2.5 | 2.6 |
| Nature of the sintering agent - Quantity (%) | Feldspar - 2.0 FFB493 - 0.5 | FFB493 |
| Resistance to infiltration and wear | + | − |
| Crumbly safety layer on cool face of furnace | Fine | Non-existent |

TABLE 8

Example Comp E1 is outside the invention.

| Example no. | Comp E1 |
|---|---|
| Aggregates (%) | 98.9 |
| Sintering agent (%) | 1.1 |
| Nature of the sintering agent - Quantity (%) | FERRO Frit TF 9015 E 0.6 FERRO Frit TF 90 5158 M 0.5 |
| Resistance to infiltration and wear | −− |
| Crumbly safety layer on cool face of furnace | Thick |

TABLE 9

Example Comp F1 is outside the invention.

| Example no. | Comp F1 |
|---|---|
| Aggregates (%) | 99.2 |
| Sintering agent (%) | 0.8 |
| Nature of the sintering agent - Quantity (%) | $B_2O_3$ - 0.8 |
| Resistance to infiltration and wear | + |
| Crumbly safety layer on cool face of furnace | Thick |

The invention claimed is:

1. A sintering agent for a dry particulate refractory composition comprising at least 70 wt. % of refractory aggregates, wherein the sintering agent comprises:
   1 to 25 wt. % of at least one phosphate compound having a loss on ignition (at 900° C.) of less than 20%; and
   75 to 99 wt. % of at least one mineral containing feldspar;
   wherein the phosphate compound is chosen from $(NaPO_3)_n$, $KH_2PO_4$, $K_2HPO_4$, $K_3PO_4$, or a mixture thereof; and
   wherein the sintering agent does not include any compound comprising a boron atom.

2. A sintering agent according to claim 1, comprising:
   12 to 25 wt.-% of the at least one phosphate compound; and 75 to 88 wt.-% of the at least one mineral containing feldspar.

3. A sintering agent according to claim 1, wherein the at least one phosphate compound has a loss on ignition (at 900° C.) of less than 18%.

4. A sintering agent according to claim 1, wherein the at least one phosphate compound is present in an amount ranging from 15 to 25 wt. %.

5. A sintering agent according to claim 1, wherein the at least one mineral containing feldspar is present in an amount ranging from 75 to 88 wt. %.

6. A dry particulate refractory composition comprising:
at least 70 wt.-% of refractory aggregates;
at least 0.5 wt.-% in weight of the sintering agent according to claim 1.

7. A dry particulate refractory composition according to claim 6, in which the refractory aggregates are aluminium oxide, silica, or a mixture thereof.

8. A dry particulate refractory composition according to claim 6, in which the refractory aggregates are chosen from the group consisting of zirconia, zircon, magnesite, olivine, chromium oxide or chromium ore, spinel, silicon carbide, quartzite, quartz, vitreous silica, brown corundum, white corundum, tabular alumina, calcinated alumina, reactive or semi-reactive alumina, bauxite, sintered or electro-cast sinter, and calcinated chamotte having a rate of alumina of between 30% and 75% in mass, andalusite, kyanite, sillimanite or a mixture of these aggregates.

9. A method of forming a refractory lining, comprising:
shaping a dry particulate refractory composition according to claim 6; and
sintering the dry particulate refractory composition.

10. A refractory lining comprising a dry particulate refractory composition according to claim 6.

11. The method of claim 9, wherein the refractory lining is incorporated into a crucible induction furnace, channel furnace inductor, or a channel furnace tank.

12. A sintering agent according to claim 1, comprising:

15 to 25 wt. % of the at least one phosphate compound; and 75 to 85 wt. % of the at least one mineral containing feldspar.

13. A sintering agent for a dry particulate refractory composition comprising at least 70 wt. % of refractory aggregates, wherein the sintering agent comprises:

1 to 98 wt. % of at least one alkali metal phosphate compound having a loss on ignition (at 900° C.) of less than 20%;

1 to 98 wt. % of at least one mineral containing feldspar; and 1 to 50 wt. % of at least one alkali metal silicate;

wherein the sintering agent does not include any compound comprising a boron atom.

14. A sintering agent according to claim 13, wherein the alkali metal phosphate compound includes at least one of the following chemical compounds: $(NaPO_3)_n$, $KH_2PO_4$, $K_2HPO_4$, $K_3PO_4$, or a mixture thereof.

15. A sintering agent according to claim 13, wherein the at least one alkali metal silicate comprises sodium silicate.

* * * * *